United States Patent [19]

Tamagawa et al.

[11] Patent Number: 5,787,263
[45] Date of Patent: Jul. 28, 1998

[54] METHOD OF AN APPARATUS FOR CONTROLLING DATA TRANSFER

[75] Inventors: Masahiro Tamagawa; Masato Maebayashi, both of Kawasaki, Japan

[73] Assignee: Fujitsu Limited, Kawasaki, Japan

[21] Appl. No.: 645,784

[22] Filed: May 14, 1996

Related U.S. Application Data

[63] Continuation of Ser. No. 214,699, Mar. 18, 1994, abandoned.

[30] Foreign Application Priority Data

May 28, 1993 [JP] Japan ................................. 5-126628

[51] Int. Cl.$^6$ .................................................... G06F 13/14
[52] U.S. Cl. ................................... 395/287; 395/290
[58] Field of Search ................................. 395/287, 290

[56] References Cited

U.S. PATENT DOCUMENTS

| | | | |
|---|---|---|---|
| 4,541,043 | 9/1985 | Ballegeer et al. | 364/200 |
| 4,964,034 | 10/1990 | Jaskowiak | 364/200 |
| 5,191,649 | 3/1993 | Cadambi et al. | 395/200 |
| 5,204,864 | 4/1993 | Won | 371/29.5 |
| 5,280,623 | 1/1994 | Sodos et al. | 395/325 |
| 5,299,193 | 3/1994 | Szczepanek | 370/85.1 |
| 5,345,569 | 9/1994 | Tran | 395/375 |
| 5,473,762 | 12/1995 | Krein et al. | 395/287 |
| 5,487,066 | 1/1996 | McNamara | 370/85.2 |

FOREIGN PATENT DOCUMENTS 2-187850  7/1990  Japan ........................... G06F 13/374

Primary Examiner—Glenn A. Auve
Attorney, Agent, or Firm—Staas & Halsey

[57] ABSTRACT

A method of controlling data transfer through a system bus between units in a computer system employs a split transfer technique that transfers data transfer requests separately from responses to the requests. The method provides one of the units with a bus grant signal to allow the unit to transfer a plurality of transferrable statuses to another unit that has requested them.

20 Claims, 11 Drawing Sheets

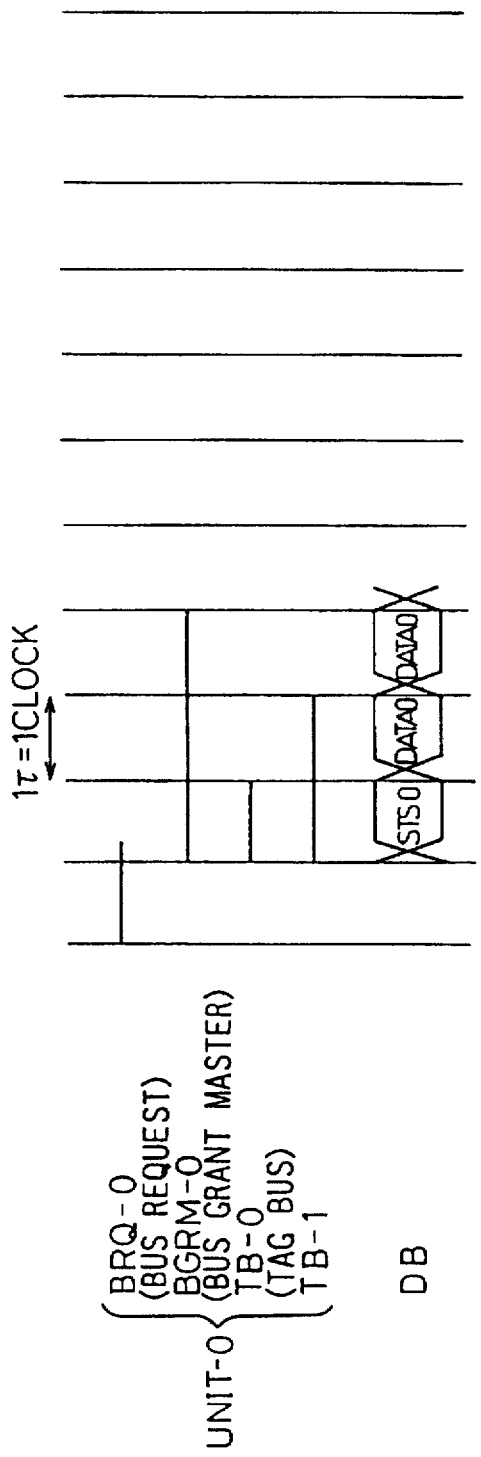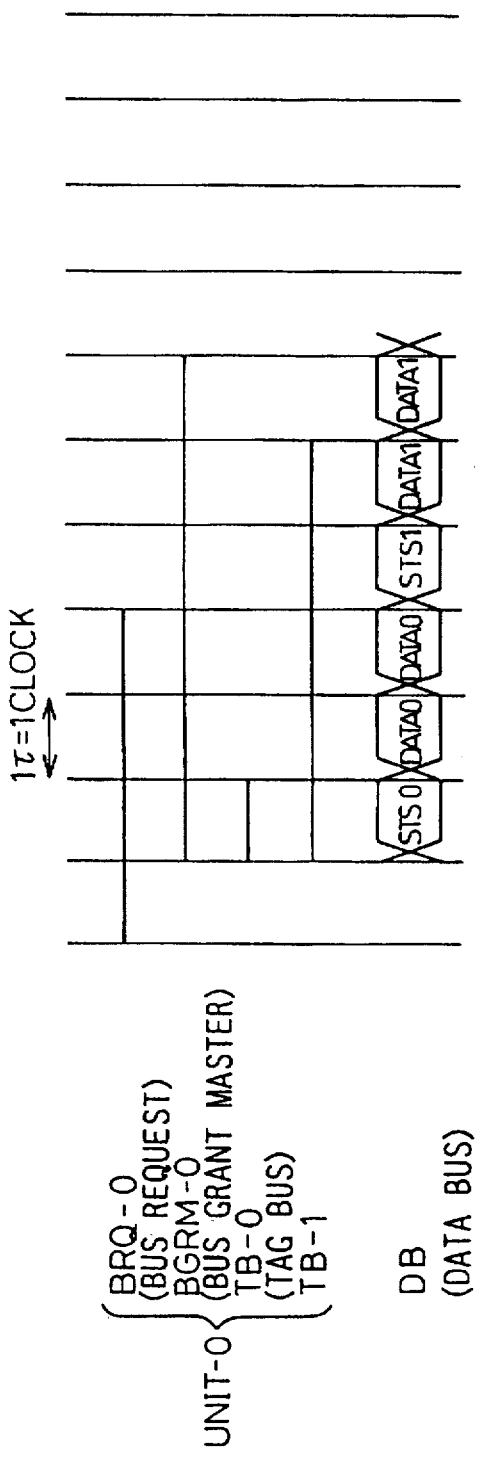

METHOD OF AN APPARATUS FOR CONTROLLING DATA TRANSFER

This application is a continuation of application number 08/214,699, filed Mar. 18, 1994, now abandoned.

BACKGROUND OF THE INVENTION

1. Field of the Invention

The present invention relates to a method of controlling data transfer through a general-purpose system bus in a computer system, and particularly, to a split transfer technique to reduce ineffective bus hold.

2. Description of the Related Art

A bus control method employing a split transfer technique involves a bus, units connected to the bus, and a bus handler. If any one of the units has a command (or data) to be transferred to another of the units, it sends a bus request signal to the bus handler. The bus handler sends a bus grant signal to the unit. Upon receiving the bus grant signal, the unit becomes a bus master (a requester) and sends the command to another unit serving as a bus slave (a receiver). Once the command is completely received by the bus slave, the bus handler switches the bus grant signal from the bus master to another unit that is issuing a bus request signal.

A response to the transferred command is made in real time to the bus master through a response line of the bus if the response is an instantaneous one such as an error in the bus. When the command is correctly received by the bus slave, the bus slave prepares a status designating the end of the command process and, if necessary, its data according to the command and sends a bus request signal to the bus handler. Upon receiving the bus grant signal from the bus handler, the bus slave becomes a new bus master, and the previous bus master becomes a new bus slave. The new bus master transfers a status and, if necessary, its prepared data to the new bus slave. When the status and, if necessary, its data are received by the new bus slave, the command originated by the previous bus master is completed.

The split transfer technique allows no unit to monopolize the bus for a long time, thereby to effectively use the bus.

The bus handler incorporates an arbitrator, which accepts no bus request signal until received request signals are completely resolved. The bus handler allows any unit to transfer one status in one arbitration process. Accordingly, if many units simultaneously send bus request signals to send commands to the same receiver unit, a buffer of the receiver unit becomes full. Only when the receiver unit transfers a status in an arbitration process does the buffer thereof have a vacancy to accept one more command. The other requester units whose commands are not accepted each receive a busy signal through the response line. Accordingly, a command from a requester unit of low priority may not be accepted for a long time. This deteriorates the performance of the bus as a whole.

SUMMARY OF THE INVENTION

An object of the present invention is to provide a method of controlling data transfer through a general-purpose system bus among units in a computer system employing a split transfer technique. The method provides a proper one of the units with a bus grant signal, to allow the unit to transfer, in a single arbitration process, all transferrable statuses, so that the unit accepts as many commands, including those from units of as low a priority as possible. A busy state is thereby presented and the performance of the bus is thereby maintained.

In order to accomplish the object, the present invention provides a method of controlling data transfer through a system bus among units in a computer system employing a split transfer technique. The split transfer technique transfers data transfer requests separately from responses thereto. The method provides one of the units with a bus grant signal (BGRM) to allow the unit to transfer a plurality of transferrable statuses to another unit that has requested them.

The present invention also provides a method of controlling data transfer through a system bus among units in a computer system employing a split transfer technique. The split transfer technique transfers data transfer requests separately from responses thereto. The bus is connected to a bus handler. When one of the units sends a bus request signal (BRQ) to the bus handler, the bus handler provides the unit with a bus grant signal (BGRM).

When a first one of the units sends a command to a second one of the units through the bus, the second unit prepares statuses accordingly. The second unit continuously asserts a bus request signal so that the bus handler allows the second unit to transfer continuously all of the transferrable statuses to the first unit.

Namely, the bus handler continuously provides the second unit with the bus grant signal until the second unit drops the bus request signal. During this period, the second unit may continuously use the bus.

The bus handler monitors whether or not the unit that has received the bus grant signal continuously asserts the bus request signal for a predetermined period, and if so, the bus handler switches the bus grant signal from the unit to another unit, to prevent the unit from monopolizing and hanging up the bus.

The unit that receives the bus grant signal may record the number of transferrable statuses or status storage information, and according to the number or the information, continuously transfer the statuses.

The unit that receives the bus grant signal may determine whether or not there is an available status to follow whenever a status is transferred, and transfer, within the duration of the bus grant signal, all transferrable statuses including those prepared during the transfer operation.

BRIEF DESCRIPTION OF THE DRAWINGS

The present invention will be more clearly understood from the description as set forth below with reference to the accompanying drawings wherein:

FIG. 10(A) shows arbitration processes according to a related art;

FIG. 10(B) corresponds to FIG. 10(A) and shows arbitration processes according to the present invention;

DESCRIPTION OF THE PREFERRED EMBODIMENTS

Figure 1:
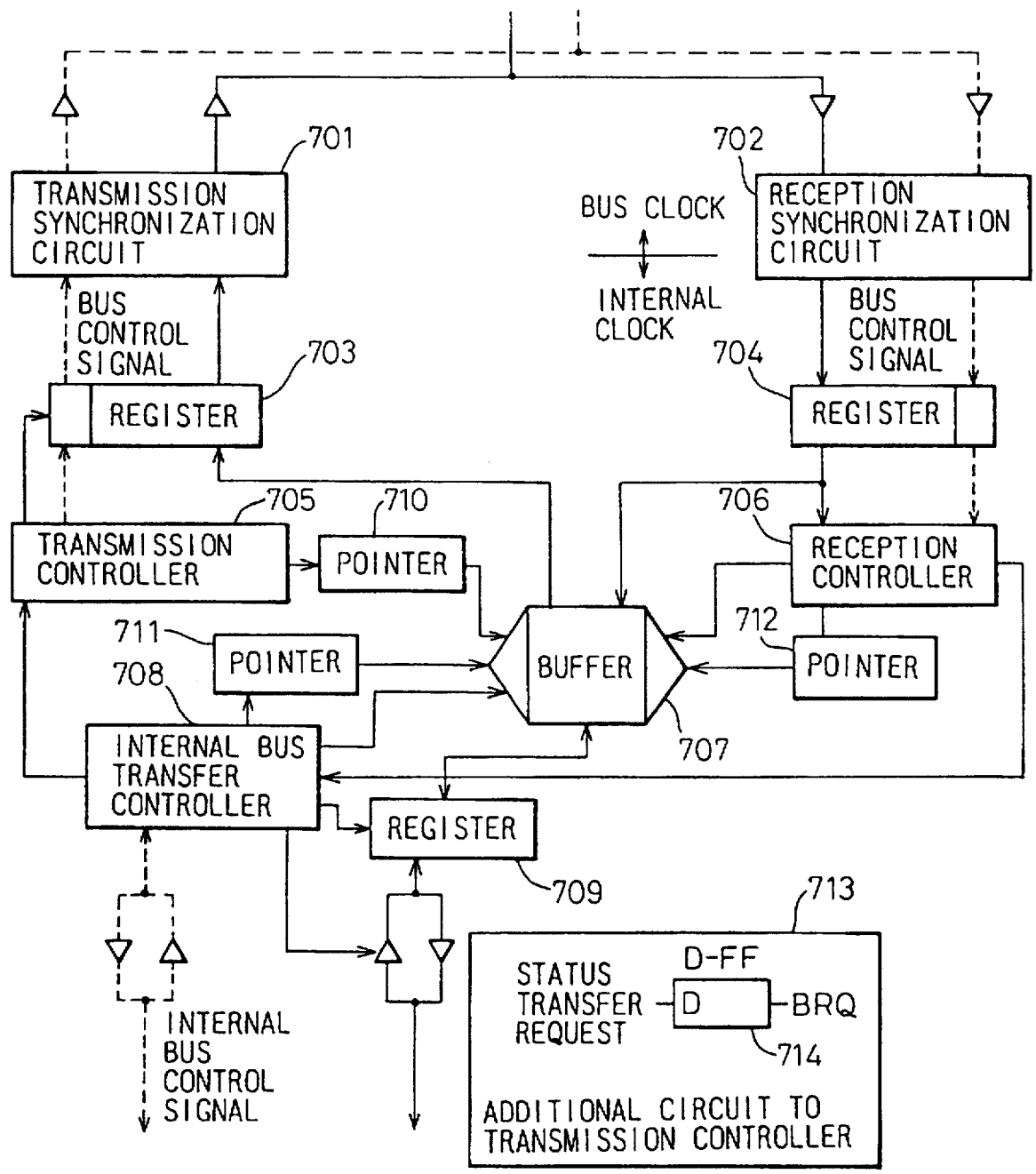
FIG. 1 is a block diagram showing a unit according to a related art.
Figure 2:
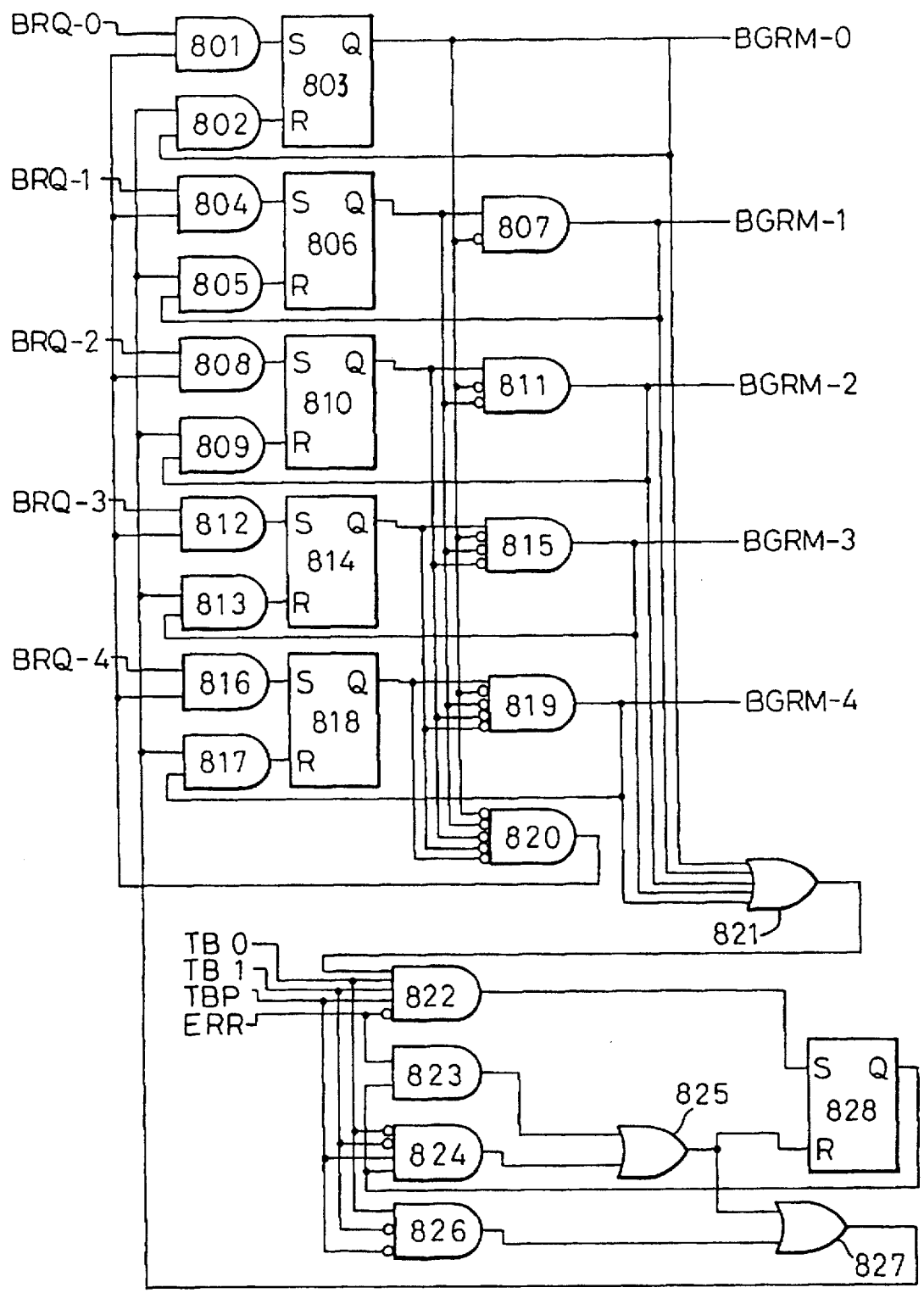
FIG. 2 is a block diagram showing an arbitrator of a bus handler according to the related art.
Figure 3:
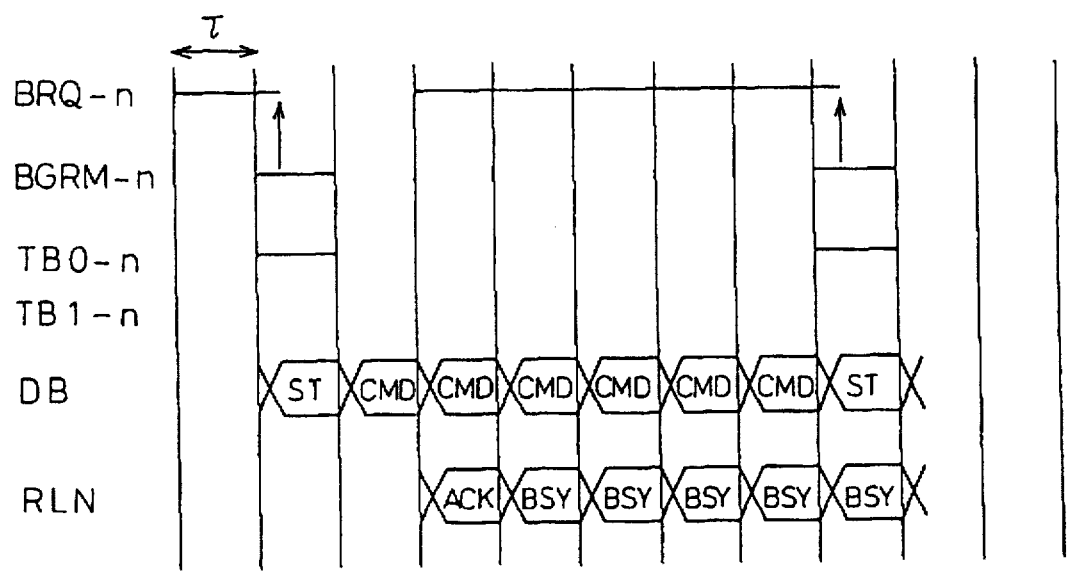
FIG. 3 is a time chart showing operations of the related art.

Before describing the preferred embodiments according to the present invention, examples of the related art are provided with reference to FIGS. 1 to 3.

FIG. 1 is a block diagram showing a bus control section of a unit according to the related art.

A bus transfers a command to the unit. According to a bus control signal, a reception synchronization circuit 702 synchronizes the command with an internal bus clock. The command is stored in a register 704. A reception controller 706 detects that the command is in the register 704 and determines whether or not the command is for itself. If it is, the command is stored in a buffer 707, and a pointer 712 is updated. The reception controller 706 informs an internal bus transfer controller 708 that the command has been stored.

According to an internal bus control signal, the controller 708 transfers the command in the buffer 707 to an internal bus. The controller 708 prepares a status according to the command, stores the same in the buffer 707, updates a pointer 711, and informs a transmission controller 705 that the status is in the buffer 707. The register 709 is controlled by the internal bus transfer controller 708, and enables the stable data read/write operation between the buffer 707 and the internal bus.

The transmission controller 705 refers to a pointer 710 to read the status out of the buffer 707, stores the same in a register 703, and updates the pointer 710. According to a bus control signal, a transmission synchronization circuit 701 synchronizes the internal clock of the status with a bus clock. Thereafter, the status is sent to the bus. The transmission controller 705 has an additional circuit 713. In response to a status transfer request from the internal bus transfer controller 708, the additional circuit 713 sets a flip-flop 714 to send a bus request signal BRQ.

FIG. 2 is a block diagram showing an arbitrator of a bus handler according to the related art.

The arbitrator has AND circuits 801, 802, 804, 805, 807 to 809, 811 to 813, 815 to 817, 819, 820, 822 to 824, and 826, S/R flip-flops 803, 806, 810, 814, 818, and 828 with a clock synchronous to an internal clock, and OR circuits 821, 825, and 827. The arbitrator uses a bus request signal BRQ for requesting the right to use the bus, a bus grant master signal (BGRM) to grant a unit the right to use the bus, tag bus signals TB0 to TBP, and an error signal ERR.

The tag bus signal TB0 is asserted for one internal clock period 1τ after the start of transfer. The tag bus signal TB1 is asserted from the start of the transfer up to one internal clock period 1τ before the end of the transfer. This signal TB1 is not asserted if transfer is completed within one internal clock period 1τ. The tag bus signal TBP is an odd parity tag bus signal.

The arbitrator is connected to units 0 to 4 in FIG. 2. A bus request signal BRQ-0 from the unit 0 sets the flip-flop 803 if none of the units holds the bus grant signal BGRM. In response to the next clock pulse, the unit 0 receives a bus grant signal BGRM-0.

Similarly, a bus request signal BRQ-1 from the unit 1 sets the flip-flop 806 if none of the units holds the bus grant signal BGRM. In response to the next clock pulse, the unit 1 receives a bus grant signal BGRM-1 if none of the units having lower numbers than the unit 1 is sending the bus request signal BRQ.

In the same manner, each of the units 2 to 4 may receive the bus grant signal BGRM.

The flip-flop 828 is set when the tag bus signals TB0, TB1, and TBP are each 1 and the error signal ERR is 0. Namely, the flip-flop 828 is set at the start of transfer. The flip-flop 828 is reset when an output Q of the flip-flop 828 is 1 to indicate data transfer, the tag bus signals TB0 and TB1 are each 0, and the tag bus signal TBP is 1, or when the output Q of the flip-flop 828 is 1 and the error signal ERR is 1. In response to a clock pulse following the reset, the bus grant signal BGRM is dropped. When the signal TB0 is 1 and the signals TB1 and TBP are each 0, i.e., when the transfer is completed within one clock period 1τ, the signal BGRM is dropped.

FIG. 3 is a time chart showing operations of the related art.

In the figure, the buffer of an optional unit "n" is full, and the unit n is sending a bus request signal BRQ-n to return a status ST. Upon receiving a bus grant signal BGRM-n from the bus handler to authorize the unit n to use the bus, the unit n returns the status ST. As a result, the buffer of the unit n has a vacancy to accept a first command CMD transferred from another unit. The units that have sent commands CMDs following the first command CMD to the unit n receive each a busy signal BSY through a response line RLN because the buffer of the unit n has no other vacancy. In this case, the unit n is unable to return the next status because the arbitrator of the bus handler never provides the unit n with the bus grant signal BGRM until the bus request signals BRQs stored in the bus handler in the preceding arbitration process are completely resolved. This results in deteriorating the efficiency of the bus.

Figure 4A:
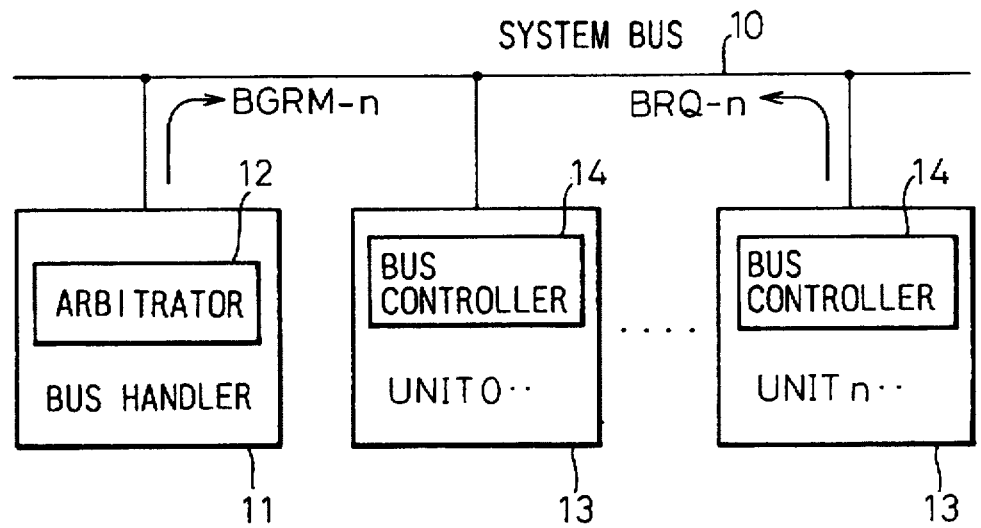
FIG. 4(A) is a block diagram showing a principle of the present invention.

FIG. 4(A) explains the principle of a computer system according to the present invention. The system includes a system bus 10, which connects a bus handler 11 and units 13 to one another. The bus handler 11 controls the bus 10 and incorporates an arbitrator 12 for arbitrating contention and priority to use the bus 10. The units 13 may be a CPU, I/O controllers, etc. Each of the units incorporates a bus controller 14.

Figure 4B:
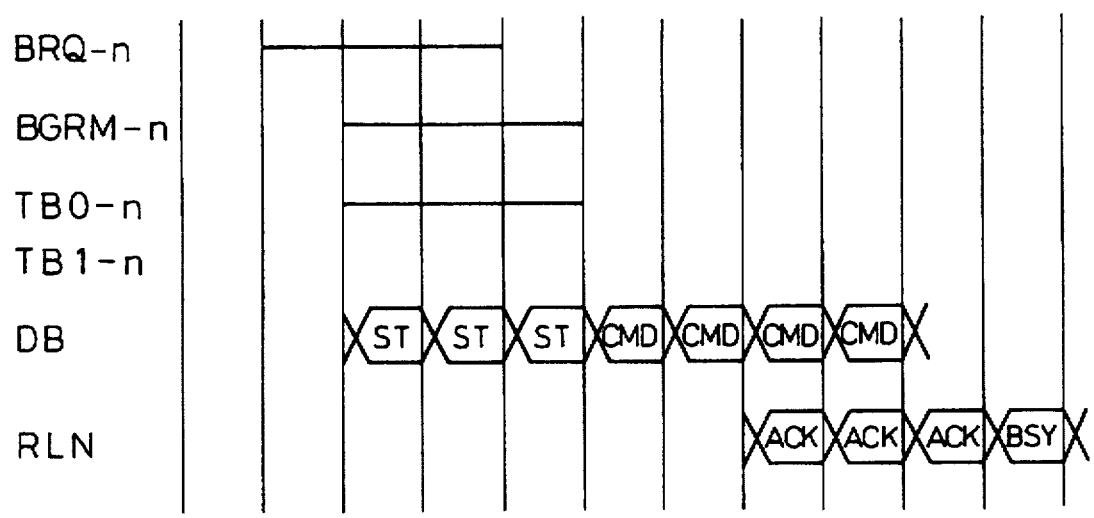
FIG. 4(B) is a time chart showing operations of the arrangement of FIG. 4(A)

FIG. 4(B) is a time chart showing operations of the arrangement of FIG. 4(A). An optional unit "n" among the units 13 issues a bus request signal BRQ-n, and the bus handler 11 provides the unit n with a bus grant signal BGRM-n to allow the unit n to use the bus 10. A tag bus signal TB0-n indicates that the unit n starts to use the bus 10. A tag bus signal TB1-n indicates that the unit n is using the bus 10 and falls to 0 one clock period 1τ before the end of the use. A data signal DB is used to transmit statuses STs and commands CMDs. A response line RLN transmits an acknowledge signal ACK and a busy signal BSY.

The system bus 10 exchanges data among the units 13. The system bus 10 employs a split transfer technique that separately transfers data transfer requests from responses thereto. The arbitrator 12 of the bus handler 11 arbitrates bus request signals BRQs from the units 13 and provides the request issuing unit 13 with the bus grant signal BGRM.

According to the present invention. the bus controller 14 provides one of the units 13. e.g.. a unit n, with the bus grant signal BGRM to allow the unit n to transfer all transferrable statuses STs to the unit that requested them.

Further, according to the present invention, the bus controller 14 of one of the units 13. e.g.. a unit n, continuously asserts the bus request signal BRQ so that the bus handler 11 may continuously provide the unit n with the bus grant signal BGRM until the unit n transfers all transferrable statuses STs to the unit that requested them.

In addition, and also according to the present invention, the bus handler 11 continuously provides one of the units 13 with the bus grant signal BGRM until the unit drops its bus request signal BRQ, so that the unit may continuously use the system bus 10.

According to the present invention, the arbitrator 12 of the bus handler 11 monitors whether or not one of the units 13 is continuously asserting its bus request signal BRQ for a predetermined period, and if it is so, switches the bus grant signal BGRM from the unit to another unit, to thereby prevent a hang-up of the bus.

According to the present invention, one of the units 13 that has received the bus grant signal BGRM records the number of transferrable statuses STs, or status storage information and continuously transfers the statuses STs according to the number or the information.

According to the present invention, one of the units 13 that has received the bus grant signal BGRM determines whether or not there is another transferrable status ST after a transferred status ST, and transfers, within the duration of the bus grant signal, all transferrable statuses STs including those that have been prepared during the transfer of the statuses.

In this way, each unit 13 according to the present invention continuously sends the bus request signal BRQ until transferrable statuses STs are completely transferred. Unlike the prior art that causes an error if the bus request signal BRQ continues after a status is sent, the present invention employs another error detector that detects no error even if the bus request signal BRQ continues after a status is sent. For example, the error detector according to the present invention provides an error signal if the bus request signal BRQ continues for a predetermined period. At the same time, the bus handler 11 according to the present invention continuously provides a unit with the bus grant signal BGRM while the unit is issuing the bus request signal BRQ, so that the unit may transfer all transferrable statuses STs in response to the signal BGRM.

In FIGS. 4(A) and 4(B), the buffer of the unit n is full and contains three transferrable statuses STs. The bus controller 14 of the unit n issues the bus request signal BRQ-n. When receiving the bus grant signal BGRM from the arbitrator 12 of the bus handler 11, the unit n transmits the statuses ST. If there is a transferrable status ST after sending one status, the unit n continuously issues the bus request signal BRQ-n to send the transferrable status ST. After sending the three statuses STs in one arbitration process, the unit n will have three empty spaces in the buffer. Accordingly, the unit n receives three commands from other units during the arbitration process.

Unlike the prior art of FIG. 3 that receives commands CMDs one by one due to insufficient vacancies in a buffer, the present invention continuously receives commands CMDs in vacant spaces made by continuously transferring statuses as shown in FIG. 4(B). The present invention, therefore, improves the efficiency of use of the bus.

Figure 5:
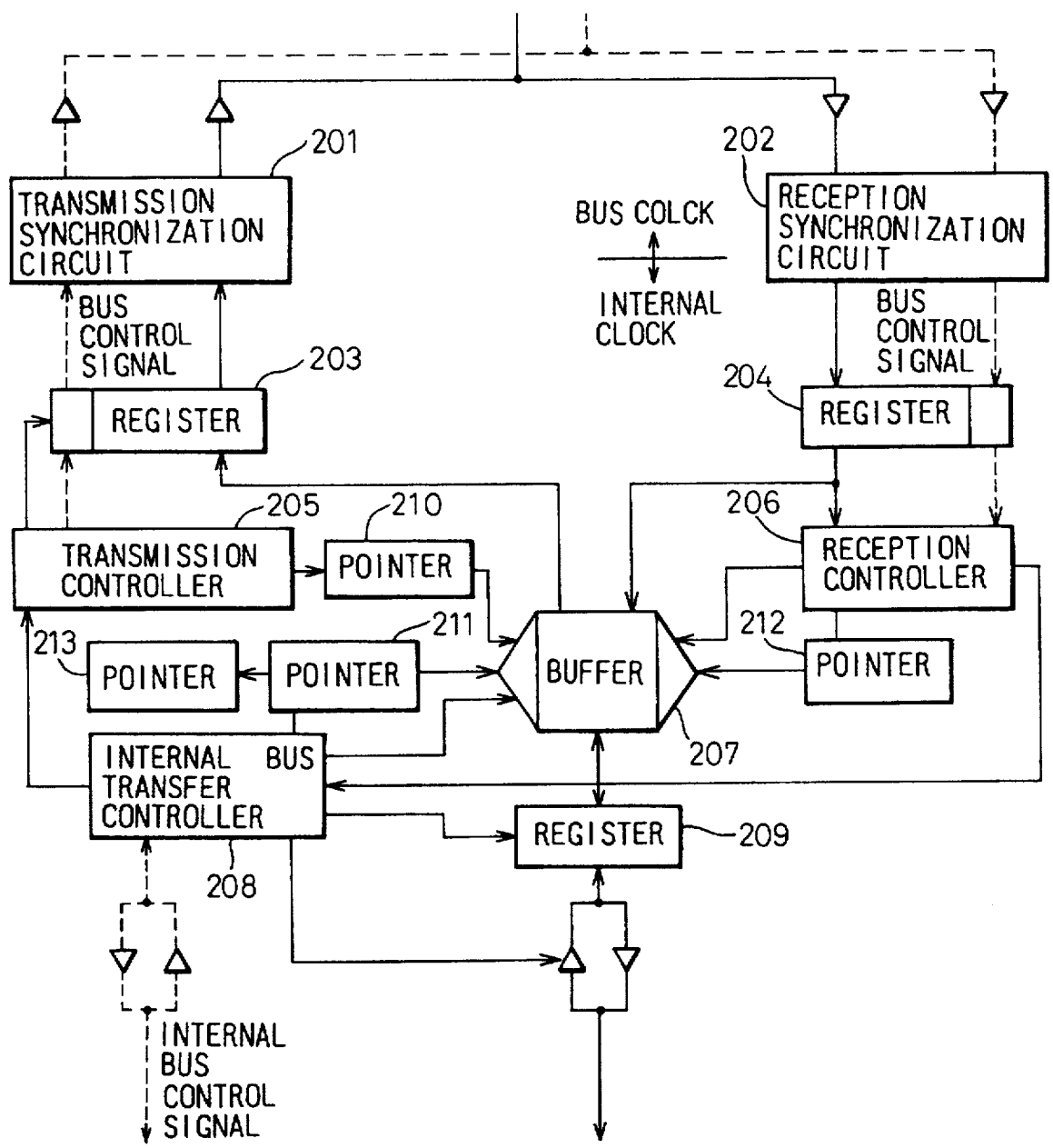
FIG. 5 is a block diagram showing a unit according to an embodiment of the present invention.
Figure 6:
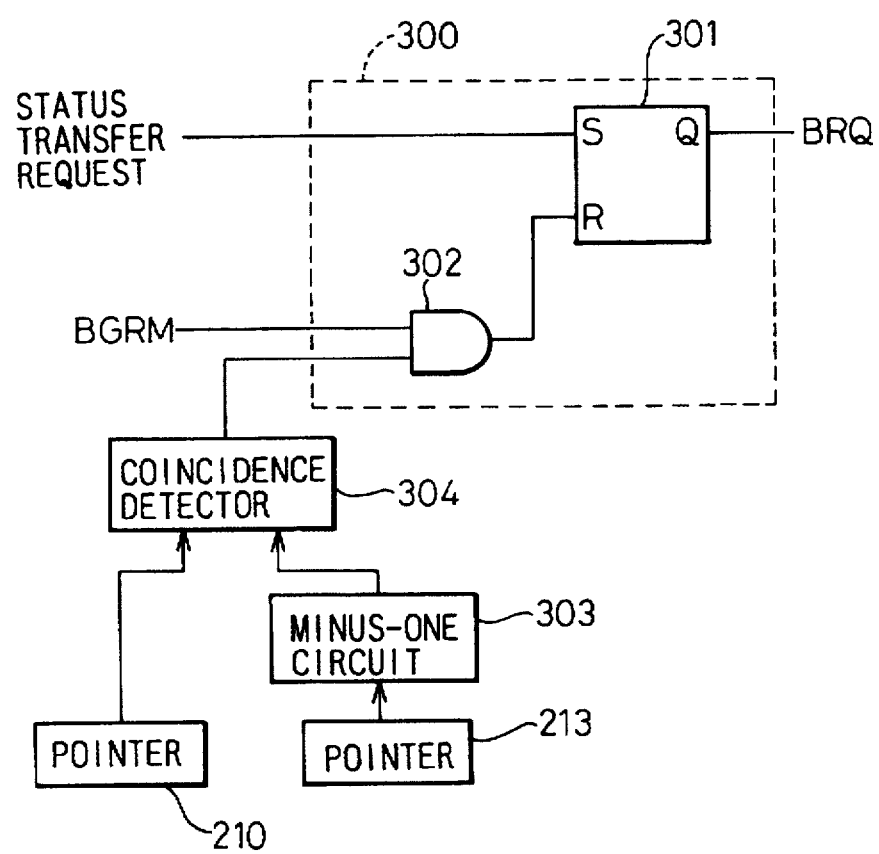
FIG. 6 shows an additional circuit provided for a transmission controller of FIG. 5.

FIG. 5 is a block diagram showing a bus control section of a unit according to an embodiment of the present invention. FIG. 6 shows an additional circuit of a transmission controller 205 of FIG. 5.

A command is transferred through a bus to the unit. According to a bus control signal, a reception synchronization circuit 202 synchronizes the command with an internal clock. The command is stored in a register 204. A reception controller 206 detects that the command is in the register 204, determines whether or not the command is for itself. and if it is, stores the command in a buffer 207. At the same time, a pointer 212 is updated. The reception controller 206 informs an internal bus transfer controller 208 that the command is in the buffer 207.

The internal bus transfer controller 208 transfers the command stored in the buffer 207 to an internal bus in response to an internal bus control signal. The controller 208 prepares a status according to the command, stores the same in the buffer 207, and updates a pointer 211. The controller 208 informs a transmission controller 205 that the status is in the buffer 207. The transmission controller 205 refers to the pointer 210, reads the status out of the buffer 207, stores the same in a register 203, and updates the pointer 210. According to a bus control signal, a transmission synchronization circuit 201 synchronizes the internal clock signal of the status stored in the register 203 with the bus clock signal, and the status is transmitted to the bus. The register 209 is controlled by the internal bus transfer controller 208, and enables the stable data read/write operation between the buffer 207 and the internal bus.

These processes resemble the processes of the related art explained above. According to the present invention, the value of the pointer 211 is saved in a pointer 213 when the bus grant signal BGRM is transferred to the unit according to the bus control signal. The pointer 211 is updated whenever a status is stored in the buffer 207, similar to the related art. The bus request signal BRQ is continuously issued until the pointer 210 becomes equal to the pointer 213, to thereby transmit through the bus all statuses in the buffer 207 accumulated until the bus grant signal BGRM was received.

To achieve this, the transmission controller 205 is provided with the additional circuit 300 of FIG. 6. The circuit 300 has a flip-flop 301 that is set in response to a status transfer request and provides the bus request signal BRQ. The pointer 210 is updated after a status is transferred through the bus. The pointer 213 is decremented by one by a minus-one circuit 303. A coincidence detector 304 determines whether or not the pointer 210 is equal to the pointer 213 decremented by one. When they are equal to each other and when the unit holds the bus grant signal BGRM, an output of an AND circuit 302 resets the flip-flop 301. Meanwhile, the bus request signal BRQ is continuously issued.

The transmission controller 205 refers to the pointer 210, reads a status out of the buffer 207, transfers the status to the register 203, and updates the pointer 210. When the pointers 210 and 213 become equal to each other, the bus request signal BRQ is dropped to complete the transfer of the statuses.

Figure 7:
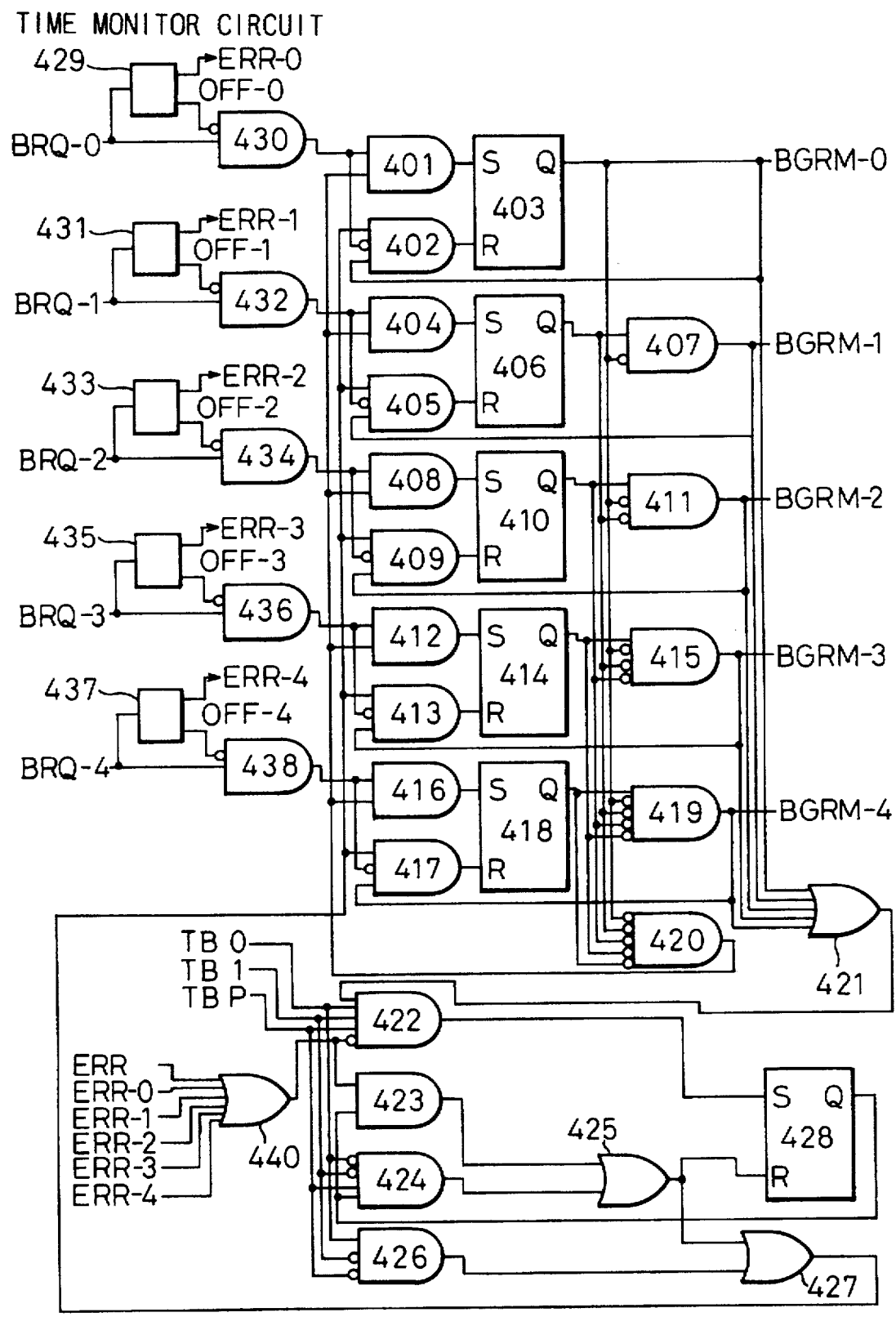
FIG. 7 is a block diagram showing an arbitrator of a bus handler according to the embodiment of the present invention.

FIG. 7 shows an arbitrator of a bus handler according to an embodiment of the present invention.

Five units 0 to 4 are connected to the bus handler, and the bus handler controls the right to use the bus among the units 0 to 4. The arbitrator has AND circuits 401, 402, 404, 405, 407 to 409, 411 to 413, 415 to 417, 419, 420, 422 to 424, 426, 430, 432, 434, 436, and 438, flip-flops 403, 406, 410, 414, 418, and 428 having a clock synchronized to an internal clock, OR circuits 421, 425, 427, and 440, and time monitor circuits 429, 431, 433, 435, and 437.

The arbitrator handles bus request signals BRQ-i (i=0 to 4), bus grant signals BGRM-i to the units i, an error transmission signal ERR, error signals ERR-i to indicate that the unit i has trouble, a tag bus signal TB0 to be asserted for an internal clock period 1τ after the start of transfer, a tag bus signal TB1 to be asserted from the start of the transfer up to one clock period 1τ before the end of the transfer (when the transfer is completed within one period 1τ, the signal TB1 is not asserted), an odd tag bus parity signal TBP, and disable signals OFF-i to disable the bus request signals BRQ-i of the units i.

The bus request signal BRQ-0 from the unit 0 sets the flip-flop 403 when none of the units holds the bus grant signal BGRM. In response to the next clock pulse, the bus grant signal BGRM-0 is provided to the unit 0. When the bus request signal BRQ-0 rises, the time monitor circuit 429 monitors whether or not the bus request signal BRQ-0 lasts for a predetermined period. If the bus request signal BRQ-0 is 1 for the predetermined period, it is determined that a failure has occurred in the unit 0. Accordingly, the disable signal OFF-0 is provided to the AND circuit 430, which disables the bus request signal BRQ-0, to thereby prevent a hang-up of the bus. At the same time, the signal ERR-0 is provided to indicate that an error has occurred in the unit 0.

Similarly, the bus request signal BRQ-1 from the unit 1 sets the flip-flop 406 when none of the units keeps the bus grant signal BGRM. In response to the next clock pulse, the bus grant signal BGRM-1 is provided to the unit 1 if none of the units having lower numbers than the unit 1 is issuing the bus request signal BRQ. The time monitor circuit 431 functions in the same manner as the time monitor circuit 429.

In this way, the bus grant signal BGRM is granted to any one of the units 2 to 4.

The flip-flop 428 is set when the following conditions are all met:

(1) Any one of the units holds the bus grant signal BGRM.

(2) The tag bus signals TB0, TB1, and TBP are each 1.

(3) The error signals ERR and ERR-0 to ERR-4 are each 0.

Namely, the flip-flop 428 is set at the start of transfer if there is no error. The flip-flop 428 is reset when an output Q of the flip-flop 428 is 1 to indicate data transfer, the tag bus signals TB0 and TB1 are each 0, and the tag bus signal TBP is 1, or when the output Q of the flip-flop 428 is 1 and the error signal ERR or the error signals ERR-0 to ERR4 are 1.

For example, the flip-flop 403 for the unit 0 that is holding the bus grant signal BGRM-0 will be reset when the flip-flop 428 is reset at the end of data transfer. Accordingly, the bus grant signal BGRM-0 is dropped at the next clock pulse. When the tag bus signal TB0 is 1 and the tag bus signals TB1 and TBP are each 0 to complete data transfer within one clock period 1τ, the flip-flop 403 is reset to drop the bus grant signal BGRM-0.

The flip-flops 406, 410, 414, and 418 providing other units with the bus grant signals BGRMs are reset in the same manner.

The arrangement of FIG. 7 according to the present invention is capable of continuously issuing the bus grant signal BGRM. Namely, this arrangement does not negate the signal BGRM while the bus request signal BRQ is being issued. To achieve this, the bus request signals BRQs of the respective units are inverted and connected to the AND circuits 402, 405, 409, 413, and 417 that are connected to the reset terminals of the flip-flops 403, 406, 410, 414, and 418 connected to the units, respectively. If any one of the units continuously issues the bus request signal BRQ after transmitting a status, the bus grant signal BGRM will be continuously sent to the unit.

Figure 8:
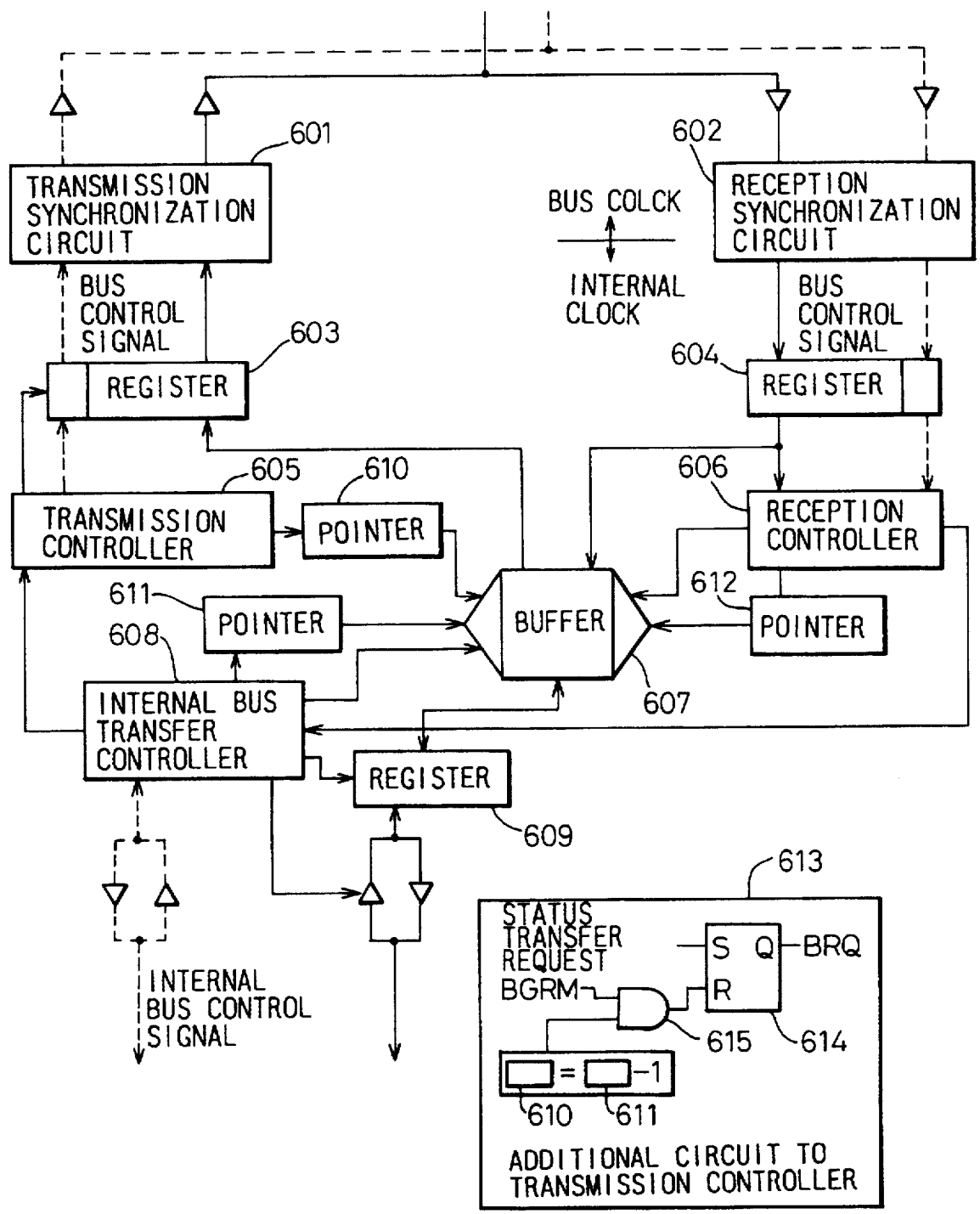
FIG. 8 is a block diagram showing a unit according to another embodiment of the present invention.

FIG. 8 is a block diagram showing a bus control section of a unit according to another embodiment of the present invention.

Elements 601 to 611 of FIG. 8 correspond to the elements 201 to 211 of FIG. 5. The embodiment of FIG. 8 differs from that of FIG. 5 in that there is no pointer (the pointer 213 of FIG. 5), for saving the pointer 611 that holds an address in the buffer 607 where a status is stored, but that the transmission controller 605 has an additional circuit 613. The additional circuit 613 includes a flip-flop 614 for issuing a bus request signal BRQ and a reset circuit for resetting the flip-flop 614. This reset circuit differs from that of FIG. 6.

Upon receiving a bus grant signal BGRM, this embodiment transfers all transferable statuses including those that have been prepared during the transfer of the statuses. For this purpose, this embodiment continuously issues the bus request signal BRQ until the pointer 610 becomes equal to the pointer 611. This is achieved by the additional circuit 613 of the transmission controller 605.

In response to a status transfer request prepared inside the unit, the flip-flop 614 of the additional circuit 613 issues the bus request signal BRQ. The pointer 610 is updated after a status is transferred to the bus. When the pointer 610 becomes equal to the pointer 611 minus one and when the unit holds the bus grant signal BGRM, the flip-flop 614 is reset. During this process, the bus request signal BRQ is continuously issued.

The transmission controller 605 refers to the pointer 610, reads a status out of the buffer 607, transfers the same to the register 603, and updates the pointer 610. When the pointer 610 becomes equal to the pointer 611, the bus request signal BRQ is dropped to complete the transfer of a series of statuses.

Figure 9:
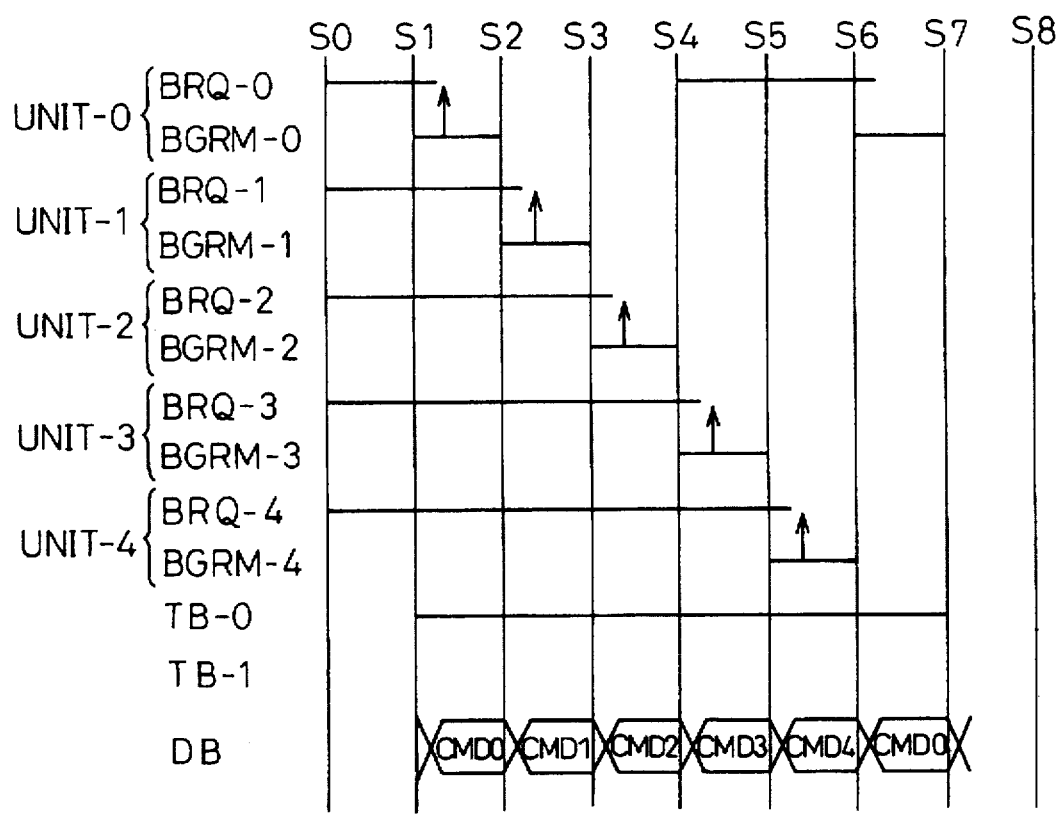
FIG. 9 is a time chart showing standard arbitration processes.

FIG. 9 is a time chart showing a standard arbitration operation.

The bus handler stores bus request signals BRQ asserted at a time point S1 and sequentially provides the units that have issued the bus request signals BRQ with a bus grant signal BGRM in order of priority of the units. When the stored bus request signals are completely solved at a time point S6, the bus handler again stores bus request signals BRQ that are asserted at this time point and sequentially provides the units that have issued the bus request signals with the bus grant signal BGRM in order of priority of the units. This is called an arbitration process.

In the example of FIG. 9, all units 0 to 4 are each issuing a bus request signal BRQ, and a bus grant signal BGRM-0 is provided to the unit 0 having highest priority. Thereafter, the unit 0 again issues the bus request signal BRQ-0 at a time point S4, which is not accepted until the next arbitration process starts at the time point S6.

FIGS. 10(A) and 10(B) show a comparison between arbitration processes of the related art and the present invention.

According to the related art of FIG. 10(A), a given unit (a unit 0) has received a command and is issuing a bus request signal to return a status according to the command. In the figure, there are two pieces of data following the status. The number of the pieces of data is not important. It may be one, two, three, or even zero. Upon receiving a bus grant signal BGRM-0, the unit 0 drops the bus request signal BRQ-0 and asserts the tag bus signal TB0 to declare to start using the bus to transfer the status. The tag bus signal TB1 is negated one clock period 1τ before the end of use of the bus. One clock period 1τ after the negation of the signal TB1, the bus grant signal BGRM is dropped to end the use of the bus.

According to the present invention of FIG. 10(B), a given unit (a unit 0) that has received a bus grant signal BGRM-0 has two statuses in its buffer for two received commands. The unit 0 continuously issues a bus request signal BRQ-0 without dropping it even after receiving the signal BGRM-0. After transferring the first status, the bus request signal BRQ is dropped, and the second status is transferred. The bus handler knows the end of use of the bus from tag bus signals and drops the signal BGRM to complete the transfer of the statuses from the unit 0.

Figure 11A:
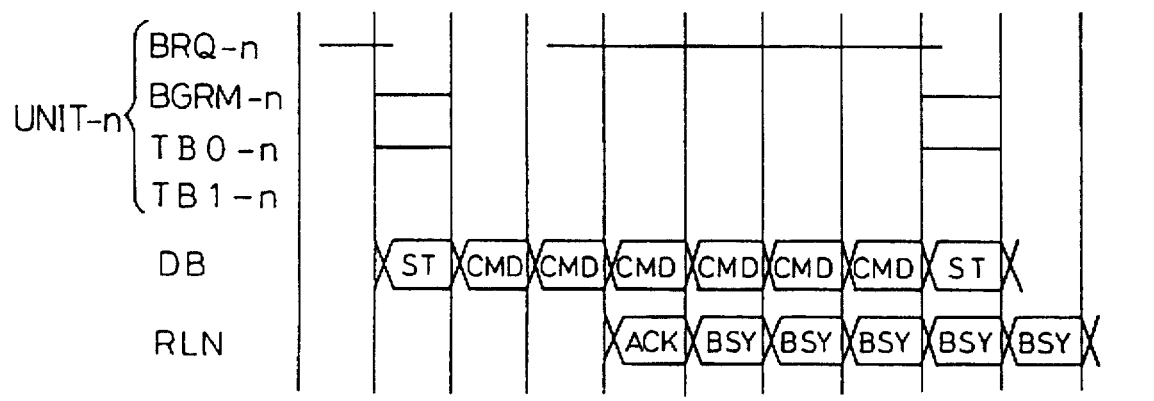
FIG. 11(A) shows arbitration processes according to another related art.
Figure 11B:
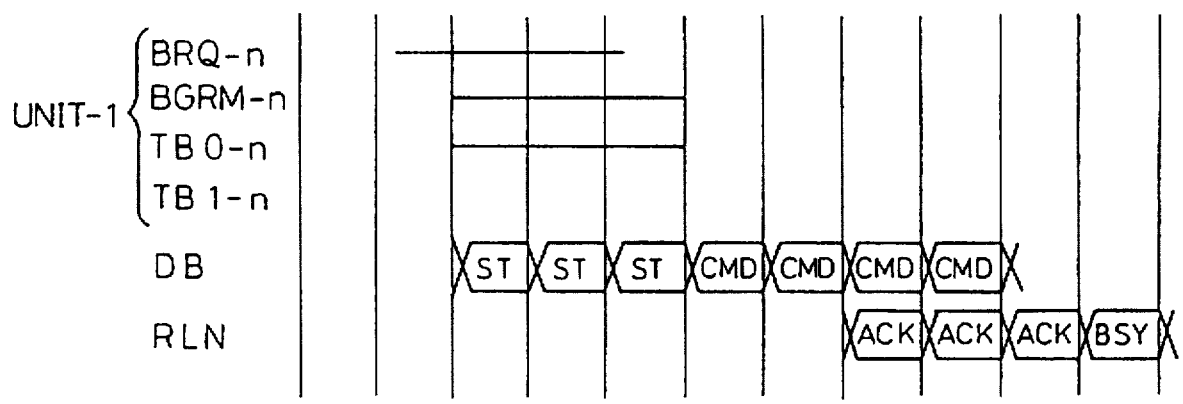
FIG. 11(B) corresponds to FIG. 11(A) and shows arbitration processes according to the present invention.

FIGS. 11(A) and 11(B) show a comparison between other arbitration processes according to the related art and the present invention.

According to the related art of FIG. 11(A), the buffer of a unit n is full, and the unit n is issuing a bus request signal BRQ-n to send a status ST. The bus handler provides the unit n with the bus grant signal BGRM-n, and the unit n transfers the status ST. As a result, the buffer of the unit n has a vacancy to accept a command CMD from another unit. Other commands reaching thereafter to the unit n are not accepted because the buffer of the unit n has no vacancy. Accordingly, the units that have sent the rejected commands to the unit n will receive a busy signal BSY through the response line RLN. The unit n is unable to continuously transfer statuses because the arbitrator of the bus handler never provides the unit n with the bus grant signal BGRM until all bus request signals BRQs received in the preceding arbitration process are completely cleared. This results in deteriorating the efficiency of the bus.

According to the present invention of FIG. 11(B), the buffer of a unit n is full and the unit has three transferrable statuses ST. The unit n issues a bus request signal BRQ-n. Upon receiving a bus grant signal BGRM-n from the bus handler, the unit n sends the status ST. The unit n continuously issues the bus request signal BRQ-n even after sending the status if there are other transferrable statuses. Namely, the unit n continuously transfers the statuses. In this example, the unit n empties three spaces in the buffer during the arbitration process. The unit n, therefore, is able to receive three commands sent from other units during the arbitration process. In this way, the present invention improves the efficiency of the bus.

As explained above, the present invention provides an optional unit with a bus grant signal to allow the unit to transfer, in a single arbitration process, all transferrable statuses. As a result, the buffer of the unit may have a plurality of vacancies to accept as many commands including those from units of lower priority as possible, to thereby shorten a busy state and maintain the performance of a bus.

We claim:

1. A method for controlling data transfer between units via a system bus in a computer system by using a bus handler, comprising the steps of:

transferring data transfer requests separately from responses thereto in a manner of a split transfer technique;

arbitrating bus request signals (BRQs) issued by the units, thereby assigning a proper one of the units as a bus master unit and providing the bus master unit with a bus grant signal (BGRM) in said bus handler;

continuously asserting a bus request signal in said bus master unit until completely transferring all transferable statuses including statuses prepared during transferring statuses for informing units other than the bus master unit as bus slaves of a reception result of commands sent therefrom when the one of the units is a bus master unit; and continuously providing the bus master unit with the bus grant signal until the bus master unit drops the bus request signal in said bus handler.

2. The method according to claim 1, wherein the bus master unit that is provided with the bus grant signal records one of a number of the transferrable statuses and status storage information, and according to one of the number and the information, continuously transfers the statuses.

3. The method according to claim 1, wherein the bus master unit provided with the bus grant signal determines whether there is an available status to follow whenever a status is transferred, and within a duration of the bus grant signal, transfers all transferrable statuses including transferrable statuses prepared during the transfer operation.

4. A method of controlling data transfer through a system bus coupled to units in a computer system, the system bus being connected to a bus handler sending a bus grant signal (BGRM) to one of the units sending a bus request signal (BRQ) to the bus handler, comprising the step of:

employing a split transfer technique for transferring data transfer requests separately from responses to the requests by allowing the one of the units to continuously assert the bus request signal so that the one of the units continuously transfers all transferrable statuses including statuses prepared during transferring statuses to another of the units requesting the transferrable statuses.

5. The method according to claim 4, wherein the bus handler continuously provides the one of the units with the bus grant signal allowing the one of the units to use continuously the bus until the one of the units drops the bus request signal.

6. The method according to claim 5, further comprising the step of monitoring whether the one of the units continuously asserts the bus request signal for a predetermined period, and if the one of the units continuously asserts the bus request signal for one predetermined period, switching the bus grant signal from the one of the units to another of the units, thereby preventing the one of the units from monopolizing and hanging up the bus.

7. The method according to claim 5, wherein the one of the units provided with the bus grant signal records one of a number of transferrable statuses and status storage information, and according to one of the number and the information, continuously transfers the statuses.

8. The method according to claim 5, wherein the one of the units provided with the bus grant signal determines whether there is an available status to follow whenever a status is transferred, and within the duration of the bus grant signal, transfers all transferrable statuses including transferrable statuses prepared during the transfer operation.

9. The method according to claim 4, further comprising the step of monitoring whether the one of the units continuously asserts the bus request signal for a predetermined period, and if the one of the units continuously asserts the bus request signal for the predetermined period, switching the bus grant signal from the one of the units to another of the units, thereby preventing the one of the units from monopolizing and hanging up the bus.

10. The method according to claim 9, wherein the one of the units provided with the bus grant signal records one of a number of transferrable statuses and status storage information, and according to one of the number and the information, continuously transfers the statuses.

11. The method according to claim 9, wherein the one of the units provided with the bus grant signal determines whether there is an available status to follow whenever a status is transferred, and within the duration of the bus grant signal, transfers all transferrable statuses including transferrable statuses prepared during the transfer operation.

12. The method according to claim 4, wherein the one of the units provided with the bus grant signal records one of a number of transferrable statuses and status storage information, and according to one of the number and the information, continuously transfers the statuses.

13. The method of claim 4, wherein the one of the units provided with the bus grant signal determines whether there is an available status to follow whenever a status is transferred, and within the duration of the bus grant signal, transfers all transferrable statuses including transferrable statuses prepared during the transfer operation.

14. An apparatus for controlling data transfer between units via a system bus in a computer system by using a bus handler that arbitrates bus request signals (BRQs) issued by the units, thereby assigns a proper one of the units as a bus master unit and provides the bus master unit with a bus grant signal (BGRM) in a manner of a split transfer technique for transferring data transfer requests separately from responses to the requests, said apparatus comprising:

a bus request signal controller, provided in said bus master unit, for continuously asserting a bus request signal until completely transferring all transferable statuses including statuses prepared during transferring statuses for informing units other than the bus master unit as bus slaves of a reception result of commands sent therefrom when the one of the units is a bus master unit; and an arbitrator, provided in said bus handler, for continuously providing the bus master with the bus grant signal until the bus master unit drops the bus request signal.

15. An apparatus for controlling data transfer between units via a system bus in a computer system by using a bus handler that arbitrates bus request signals (BROs) issued by the units, thereby assigns a proper one of the units as a bus master unit and provides the bus master unit with a bus grant signal (BGRM) in a manner of a split transfer technique for transferring data transfer requests separately from responses to the requests, said apparatus comprising:

a bus request signal controller, provided in said bus master unit, for continuously asserting a bus request signal until completely transferring all transferable statuses for informing units other than the bus master unit as bus slaves of a reception result of commands sent therefrom when the one of the units is a bus master unit, the bus request signal controller comprising:

a write pointer storing a position of a status buffer where a status has been written, a read pointer storing a position of the status buffer from where a status is to be read, a coincidence circuit determining whether the write pointer coincides with the read pointer, and a flip-flop circuit being set according to a status transfer request signal and generating the bus request signal (BRQ), and being reset according to an AND of a coincidence signal from the coincidence circuit and the bus grant signal (BGRM); and an arbitrator, provided in said bus handler, for continuously providing the bus master with the bus grant signal until the bus master unit drops the bus request signal.

16. The apparatus according to claim 15, wherein the write pointer comprises a second write pointer saving a value of the write pointer in response to the bus grant signal (BGRM).

17. The apparatus according to claim 15, wherein the value of the write pointer is updated during the transfer of statuses.

18. An apparatus for controlling data transfer between units via a system bus in a computer system by using a bus handler that arbitrates bus request signals (BROs) issued by the units, thereby assigns a proper one of the units as a bus master unit and provides the bus master unit with a bus grant signal (BGRM) in a manner of a split transfer technique for transferring data transfer requests separately from responses to the requests, said apparatus comprising:

a bus request signal controller, provided in said bus master unit, for continuously asserting a bus request signal until completely transferring all transferable statuses for informing units other than the bus master unit as bus slaves of a reception result of commands sent therefrom when the one of the units is a bus master unit; and an arbitrator, provided in said bus handler, for continuously providing the bus master with the bus grant signal until the bus master unit drops the bus request signal, the arbitrator comprising a flip-flop circuit for each of the units, the flip-flop circuit being set in response to the bus request signal (BRQ) provided by the unit and providing the unit with the bus grant signal (BGRM) according to the priority of the unit, a reset input to the flip-flop circuit being disabled while the bus request signal is sent to the flip-flop circuit.

19. The apparatus according to claim 18, wherein the arbitrator comprises a time monitor circuit for each of the units, monitoring the duration of the bus request signal (BRQ), and if the duration exceeds a predetermined period, forcibly disabling the set signal to the flip-flop circuit and enabling the reset input thereto.

20. The apparatus according to claim 19, wherein a detection signal from the time monitor circuit is used as an error signal to reset the flip-flop circuit.

* * * * *

UNITED STATES PATENT AND TRADEMARK OFFICE
CERTIFICATE OF CORRECTION

PATENT NO. : 5,787,263
DATED : July 28, 1998
INVENTOR(S) : Masahiro TAMAGAWA et al.

It is certified that error appears in the above-indentified patent and that said Letters Patent is hereby corrected as shown below:

Col. 12, line 47, after "circuit" insert --,--.

Signed and Sealed this

Twenty-seventh Day of February, 2001

Attest:

NICHOLAS P. GODICI

Attesting Officer

Acting Director of the United States Patent and Trademark Office